(12) United States Patent
Kitahata et al.

(10) Patent No.: US 8,063,002 B2
(45) Date of Patent: Nov. 22, 2011

(54) ROLLING DEVICE AND ROLLING DEVICE MANUFACTURING METHOD

(75) Inventors: Kouji Kitahata, Osaka (JP); Masahiro Tabata, Kashiwara (JP); Ryuji Nakata, Osaka (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 304 days.

(21) Appl. No.: 12/153,812

(22) Filed: May 23, 2008

(65) Prior Publication Data
US 2008/0293598 A1   Nov. 27, 2008

(30) Foreign Application Priority Data

May 24, 2007  (JP) ................................. 2007-138018
Jan. 23, 2008  (JP) ................................. 2008-012801

(51) Int. Cl.
*C10M 171/00*   (2006.01)
*F16C 33/10*   (2006.01)

(52) U.S. Cl. ........... 508/110; 508/100; 508/591; 384/13

(58) Field of Classification Search .................. 508/100, 508/110, 591; 384/13
See application file for complete search history.

(56) References Cited

U.S. PATENT DOCUMENTS

| 3,779,918 | A | * | 12/1973 | Ikeda et al. | 508/100 |
| 5,588,751 | A | | 12/1996 | Nakata et al. | |
| 5,939,363 | A | * | 8/1999 | Toyota et al. | 508/106 |
| 6,228,813 | B1 | * | 5/2001 | Yabe et al. | 508/106 |
| 2004/0209784 | A1 | * | 10/2004 | Hardman et al. | 508/204 |

FOREIGN PATENT DOCUMENTS

| EP | 1 591 683 | | 11/2005 |
| JP | 8-312652 A | | 11/1996 |
| JP | 10-19047 A | | 1/1998 |
| JP | 10019047 A | * | 1/1998 |
| JP | 2000-319681 A | | 11/2000 |
| JP | 2001-99164 A | | 4/2001 |
| JP | 2001-99170 A | | 4/2001 |
| WO | WO 2007/026868 | | 3/2007 |

OTHER PUBLICATIONS

European Search Report dated Sep. 24, 2008.

* cited by examiner

*Primary Examiner* — Ellen McAvoy
*Assistant Examiner* — Taiwo Oladapo
(74) *Attorney, Agent, or Firm* — McGinn IP Law Group, PLLC

(57) ABSTRACT

A solid lubricating composition having resin material is disposed between an outer ring and an inner ring of a ball bearing. As the resin material contained in the solid lubricating composition, resin material having a property of being solidified when the resin material in a fluid state is irradiated with an ultraviolet beam is used.

18 Claims, 3 Drawing Sheets

ROLLING DEVICE AND ROLLING DEVICE MANUFACTURING METHOD

RELATED APPLICATION

This application claims priority from Japanese Patent Application No. 2007-138018, filed May 24, 2007 and Japanese Patent Application No. 2008-012801, filed Jan. 23, 2008, which are incorporated by reference in their entirety.

BACKGROUND OF THE INVENTION

The present invention relates to a rolling device having a rolling element and, particularly, to a rolling bearing, a linear system, and a ball screw. Further, the invention relates to a method of manufacturing a rolling device and, particularly, to a method of manufacturing a rolling bearing, a leaner system, or a ball screw.

As a rolling bearing, a ball bearing described in JP-A-8-312652 has heretofore been known.

The rolling bearing is provided with an outer ring, an inner ring, a plurality of balls, and a solid lubricating composition, in which the solid lubricating composition is disposed between the outer ring and the inner ring.

The solid lubricating composition is made from a mixture of resin material and lubricant. The solid lubricating composition is filled between the outer ring and the inner ring in a fluid state to be heated to a temperature of 150° C. or more that is higher than a melting point of the resin material, followed by solidification by cooling.

Since the solid lubricating composition is used as the lubricant in the conventional ball bearing, it is possible to reliably lubricate the bearing ring and the balls under severe lubrication conditions such as a high load, a high temperature, and a impact load, while a hardness of the inner and outer rings and the rolling element is sometimes reduced due to the temperature of 150° C. or more because of the necessity of heating a temperature around the inner and the outer rings to the temperature of 150° C. or more for melting the solid lubricating composition.

The inner and outer rings and the rolling element are formed from a steel material such as high carbon chrome bearing steel, case hardened steel, and high speed tool steel each of which is hardened by a heat treatment such as quenching, carburizing, carbonitriding, carburizing quenching, and tempering. However, the hardness is reduced due to a temperature equal to or higher than the tempering temperature, for example, resulting in a reduced hardness. Therefore, in the case of heating to the temperature of 150° C. or more, it is necessary to perform a heat treatment in which a tempering temperature is higher than a heating temperature or perform rapid cooling, thereby undesirably increasing a cost or requiring more strict temperature and time control.

Also, since a long time is required for increasing the temperature around the inner and outer rings to the temperature of 150° C. or more at which the resin is melted, a cycle time in manufacture of ball bearings is increased.

SUMMARY OF THE INVENTION

Accordingly, an object of the present invention is to provide a rolling device in which rolling elements and raceway surfaces are reliably lubricated under severe lubrication conditions of a high load, a high temperature, and an impact load; the raceway surfaces have a predetermined hardness without becoming fragile; and a cycle time in manufacture is reduced.

Another object of the present invention is to provide a method of manufacturing rolling device prevented from a hardness reduction of a raceway and reduced in cycle time in manufacture.

In order to solve the above-describe problems, a rolling device of the present invention comprises:

a rolling element disposing chamber having raceway surfaces on an inner surface thereof;

rolling elements disposed on the raceway surfaces; and a solid lubricating composition that is placed in the rolling element disposing chamber and includes lubricant and resin material, wherein the resin material has a property in which the resin material is solidified when the resin material in a fluid state is irradiated with at least one of an electron beam or an ultraviolet beam.

According to the present invention, since the solid lubricating composition is placed in the rolling element disposing chamber, it is possible to reliably lubricate a bearing ring and a ball under sever lubrication conditions such as a high load, a high temperature, and an impact load.

According to the present invention, since the resin material comprised in the solid lubricating composition has the property of being solidified when the resin material in the fluid state is irradiated with at least one of the electron beam and the ultraviolet beam, it is possible to solidify the solid lubricating composition only by irradiating the solid lubricating composition in the non-solidified state with at least one of the electron beam and the ultraviolet beam when placing the solid lubricating composition in the rolling element disposing chamber, and, unlike the conventional example, it is unnecessary to cool a temperature of the rolling element disposing chamber after heating to a temperature of 150° C. or more for solidifying the solid lubricating composition. Therefore, since the hardness of members forming the rolling element disposing chamber is prevented from being reduced due to the temperature of 150° C. or more, and since the members forming the rolling element disposing chamber is prevented from becoming fragile due to the temperature of 150° C. or more, it is possible to maintain strength of the members forming the rolling element disposing chamber to predetermined strength.

Further, according to the present invention, it is unnecessary to cool the temperature of the rolling element disposing chamber after heating to the temperature of 150° C. or more in order to solidify the solid lubricating composition, which is different from the conventional example. Therefore, it is possible to reduce the time for heating the temperature of the rolling element disposing chamber to the temperature of 150° C. or more, thereby remarkably reducing the cycle time in manufacture of the rolling devices.

Further, a method of manufacturing a rolling device comprises:

placing a solid lubricating composition inside a non-sealed chamber in a state where rolling elements are placed therein and the non-sealed chamber is not sealer and in a state that the solid lubricating composition is not solidified, in which the solid lubricating composition includes lubricant and resin material which has a property in which the resin material is solidified when the resin material in a fluid state is irradiated with at least one of an electron beam or an ultraviolet beam; and solidifying the solid lubricating composition by irradiating the solid lubricating composition in the non-solidified state with at least one of the electron beam and the ultraviolet beam.

According to the present invention, it is unnecessary to increase a temperature of the non-sealed chamber to 150° C. or more for solidifying the solid lubricating composition. Therefore, since the hardness of members forming the non-sealed chamber is prevented from being reduced by the temperature of 150° C. or more, and since the members forming the non-sealed chamber is prevented from becoming fragile by the temperature of 150° C. or more, it is possible to maintain strength of the members forming the non-sealed chamber to predetermined strength.

Further, according to the present invention, it is unnecessary to cool the temperature of the rolling element disposing chamber after heating to the temperature of 150° C. or more in order to solidify the solid lubricating composition, which is different from the conventional example. Therefore, it is possible to reduce the time for heating the temperature of the rolling element disposing chamber to the temperature of 150° C. or more, thereby remarkably reducing the cycle time in manufacture of the rolling devices.

According to one embodiment of the present invention, the resin material comprises a photopolymerization initiator; and the solid lubricating composition in the non-solidified state is irradiated with the ultraviolet beam.

According to the above-described embodiment, since the resin material comprises a photopolymerization initiator, and since the solid lubricating composition in the non-solidified state is irradiated with the ultraviolet beam, it is possible to solidify the solid lubricating composition simply, at a low cost, and rapidly.

According to another embodiment of the present invention, the rolling element is disposed between a raceway surface of an outer ring and a raceway surface of an inner ring; the non-sealed chamber is defined by an inner periphery of the outer ring and an outer periphery of the inner ring; the ultraviolet beam is irradiated from outside in an axial direction of the outer ring; and a timing for irradiating the ultraviolet beam is varied depending on a position of the solid lubricating composition in a radial direction of the outer ring.

According to the above-described embodiment, since a timing for irradiating the ultraviolet beam is varied depending on a position of the solid lubricating composition in a radial direction of the outer ring, it is possible to control an order of parts of the solid lubricating composition to be solidified. Therefore, it is possible to control a direction of shrinkage of the solid lubricating composition, thereby approximating an actual location of the solid lubricating composition to a desired location of the solid lubricating composition.

According to a rolling device of the present invention, it is possible to reliably lubricate a rolling element and raceway surfaces under severe conditions such as a high load, a high temperature, and impact load as well as to maintain a hardness of the raceway surfaces after the manufacture to a predetermined hardness. Further, a cycle time in manufacture is reduced.

According to a method of manufacturing a rolling device of the present invention, it is possible to prevent a reduction in hardness of raceway surfaces as well as to reduce a cycle time in rolling device manufacture.

DETAILED DESCRIPTION OF PREFERRED EMBODIMENTS

Hereinafter, the present invention will be described in detail with reference to accompanying drawings.

Figure 1:
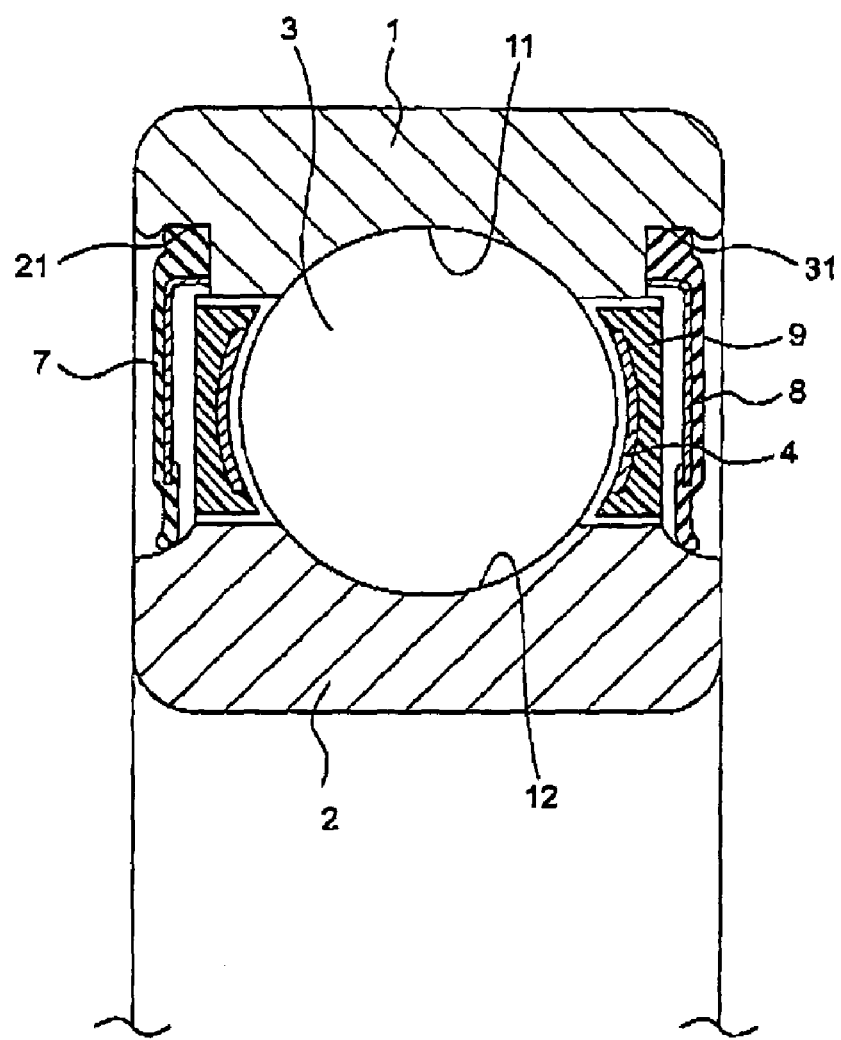
FIG. 1 is a sectional view taken along an axial direction of a ball bearing that is one embodiment of a rolling device of the present invention.

FIG. 1 is a sectional view taken along an axial direction of a ball bearing that is one embodiment of a rolling device of the present invention.

The ball bearing includes an outer ring 1, an inner ring 2, a plurality of bails 3 as one example of rolling elements, a first sealing device 7, a second sealing device 8, and a solid lubricating composition 9.

The outer ring 1 is formed with a deep groove type raceway groove 11 as one example of raceway surfaces, a first sealing mounting groove 21, and a second sealing mounting groove 31 on an inner peripheral surface. The first sealing mounting groove 21 is positioned at one side in an axial direction of the raceway groove 11, while the second sealing mounting groove 31 is positioned at the other side in the axial direction of the raceway groove 11.

The inner ring 2 has on an outer peripheral surface a deep groove type raceway groove 12 as one example of raceway surfaces. The plurality of balls 3 are disposed between the raceway groove 11 of the outer ring 1 and the raceway groove 12 of the inner ring 2 in a state of being retained by a cage 4 and are arranged with a space in a circumferential direction.

The first sealing member 7 is a ring-like member having a through-hole at a central part. One end at an outer side in a radial direction of the first sealing member 7 is fitted into and fixed to the first sealing mounting groove 21, while one end on an inner side of the radial direction of the first sealing member 7 is in slidably contact with the outer periphery of the inner ring 2. The second sealing member 8 is a ring-like member having a through-hole at a central part. One end at an outer side in a radial direction of the second sealing member 8 is fixed as being fitted into the second sealing mounting groove 31, while one end on an inner side of the radial direction of the second sealing member 8 is in slidably contact with the outer periphery of the inner ring 2.

The solid lubricating composition 9 is placed on a region enclosed by the outer ring 1, the inner ring 2, the first sealing member 7, and the second sealing member 8. The inner peripheral surface of the outer ring 1, the outer peripheral surface of the inner ring 2, an end surface of the first sealing member 7 at the side of the balls 3 in the axial direction, and an end surface of the second sealing member 8 at the side of the balls 3 in the axial direction define the rolling element disposing chamber.

The solid lubricating composition 9 includes resin material and lubricant, and the resin material has a property of being solidified when the resin material in a fluid state is irradiated with an ultraviolet beam. The resin material includes a photopolymerization initiator.

Hereinafter, the resin material usable as a part of the solid lubricating composition 9 will be described. An ultraviolet beam curable resin having the property of being solidified when the resin in a fluid state is irradiated with the ultraviolet beam is generally formed of a monomer (a diluting agent for resins, which serves as a substance becoming a resin after solidifying), an oligomer [an intermediate substance between a polymer and a monomer, which ultimately becomes a polymer (solid matter) and serves as a main ingredient of a resin], a photopolymerization initiator (substance starting a photopolymerization reaction when irradiated with an ultraviolet beam), a photopolymerization accelerator, an additive (a filler, an adhesion imparting agent), and a colorant.

Blending of at least one of the photopolymerization accelerator, the additive, and the colorant to the resin material may be omitted.

The monomer is categorized into radical polymerization monomers and cationic polymerization monomers. Examples of the radical polymerization monomers include monofunctional acrylate, di- to hexa-functional acrylates, and the like. Examples of the cationic polymerization monomers include an alicyclic epoxy resin, a glycidylether epoxy resin, urethane vinylether, an oxetane compound, and the like.

The oligomer is categorized into radical polymerization oligomers and cationic polymerization oligomers. Examples of the radical polymerization oligomers include epoxyacrylate, carboxyl group-modified epoxyacryl, urethaneacrylate, polyesteracrylate, copolymerized acrylate, and the like. Examples of the cationic polymerization monomers include an alicyclic epoxy resin, a glycidylether epoxy resin, urethane vinylether, an oxetane compound, and the like.

The photopolymerization initiator is classified into radical photopolymerization initiators and cationic photopolymerization initiators. Examples of the radical photopolymerization initiators include a benzophenone-based photopolymerization initiator, an acetophenone-based photopolymerization initiator, a thioxanthone-based photopolymerization initiator, phosphineoxide-based photopolymerization initiator, and the like. Examples of the cationic photopolymerization initiators include a sulfonium salt, an iodine slat, and the like.

The photopolymerization accelerator is categorized into radical photopolymerization accelerators and cationic photopolymerization accelerators. Examples of the radical photopolymerization accelerators include tertiary amine and the like. Examples of the cationic photopolymerization accelerators include an anthracene-based photopolymerization accelerator, a thioxanthone-based photopolymerization accelerator, and the like.

Examples of the additive include a polymerization inhibitor, an antifoaming agent, a silane coupling agent, a solvent, a thixotropy imparting agent, a polymer, a filler, a leveling agent, and the like. Examples of the colorant include a pigment, a dye, and the like.

The acrylic ultraviolet curable resin as one example of the resin material is formed of a pre-polymer having a reactive chemical structure that is called acryloyl group, a monomer, and a photopolymerization initiator and is solidified by irradiation with an ultraviolet beam on the second time scale.

Specific examples of substances belonging to each of the above-described categories are not described in detail in this specification, but some of them are found in "Development of UV/EB Curable Materials" published by CMC Publishing, Co. Ltd.

Examples of the lubricant usable as a part of the solid lubricating composition 9 include various lubricating oils. As the lubricating oil to be used herein, those that are free from the risk of reducing mechanical properties of a resin by reacting with the resin when solidifying raw materials of the resin and a lubricating component are preferred. Examples of the lubricating oil include mineral oil, poly-α-olefin oil, diester oil, polyolester oil, alkyldiphenylether oil, silicone oil, paraffin oil, fluorine oil, and the like.

Various additives may be added to the lubricating oil usable as the lubricant in order to improve characteristics such as safety. As the lubricant, the above-described lubricating oils may be used alone or in combination of two or more.

Examples of the lubricant usable of a part of the solid lubricating composition 9 further include metal soap grease, non-metal soap organic grease, and the like.

Specific examples of the lubricant include a grease containing as a thickener an alkali metal salt of aliphatic monocarboxylic acid having 12 to 24 carbon atoms and an alkali earth metal salt or an aluminum slat, a grease containing as a thickener an alkali metal salt of aliphatic monocarboxylic acid having at least one hydroxyl group and 12 to 24 carbon atoms or an alkali earth metal salt, and the like.

Specific examples of the lubricant further include a calcium complex soap grease containing as a thickener at least one of aliphatic monocarboxylic acid having 12 to 24 carbon atoms, aliphatic monocarboxylic acid containing at least one hydroxyl group and having 12 to 24 carbon atoms, and a calcium salt of aliphatic monocarboxylic acid having 2 to 11 carbon atoms, an aluminum complex soap grease containing as a thickener aliphatic monocarboxylic acid having 12 to 24 carbon atoms and an aluminum slat of aromatic monocarboxylic acid having 7 to 24 carbon atoms, and the like.

Specific examples of the lubricant yet further include a lithium complex soap grease containing as a thickener at least one of aliphatic monocarboxylic acid having 12 to 24 carbon atoms and aliphatic monocarboxylic acid containing at least one hydroxyl group and having 12 to 24 carbon atoms and at least one of aliphatic dicarboxylic acid or diester dicarboxylate having 2 to 12 carbon atoms or an aromatic monocarboxylic acid having 7 to 24 carbon atoms or a lithium salt of ester phosphates or ester borates, a grease containing a diurea compound (in a formula represented by $R^1NHCONHR^2NHCONHR^2NHCONHR^1$, $R^1$ represents a straight chain or branched chain saturated or unsaturated alkyl group having 6 to 24 carbon atoms, and $R^2$ is a divalent aromatic hydrocarbon group having 6 to 15 carbon atoms) or polyurea compound, a grease containing polytetrafluoroethylene, and the like.

A content of each of the resin material and the lubricant forming the solid lubricating composition 9 is not particularly limited, and the contents are such that a ratio of the resin material in a total amount of the solid lubricating composition 9 is 10 to 80 wt. % (i.e. a ratio of the lubricant in the total amount of the solid lubricating composition 9 is 20 to 90 wt. %).

In the rolling device of the present invention, resin material containing an ultraviolet beam curable reactive resin may be used as the resin material of the solid lubricating composition.

Specifically, a modified silicone-based resin is used as a base resin, and a photopolymerization initiator is used as a reaction initiator. As used herein, a radical polymerization initiator or a photocationic initiator (photocationic catalyst) may be used as the reaction initiator, and, examples of the photocationic initiator include a material containing an aromatic onium salt and the like.

The solid lubricating composition containing the above-described materials is prepared by adding at least one of the grease or the oil to the material obtained by using the modified silicone-based resin and the photopolymerization initiator as the reaction initiator.

Examples of the ultraviolet beam curable silicone usable as the base resin include those fall under the following categories.

Figure 2:
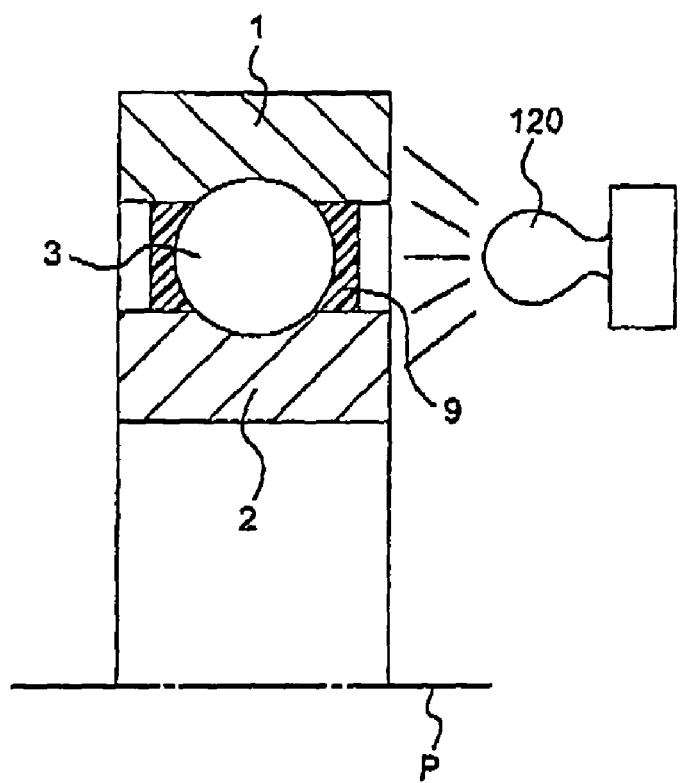
FIG. 2 is a schematic diagram showing a state in the halfway of manufacture of the ball bearing in the embodiment.

I. Radical Curable Type
  (1) acrylic modified polysiloxane (acrylic silicone)
  (2) mercapto modified polysiloxane (mercapto silicone)
II. Cation Curable Type
  (1) epoxy modified polysiloxane (epoxy silicon)
III. Complex Curable Type
  (1) mercapto/deacetonized curable silicone
  (2) acrylic/dealcoholized curable silicone FIG. 2 is a schematic diagram showing a state during manufacture of the ball bearing in the above embodiment. Hereinafter, a ball bearing manufacturing method according to one embodiment of the rolling device manufacturing method of the present invention will be described by using FIG. 2. Since FIG. 2 is a schematic diagram, the shape of the ball bearing is not precisely accurate, and the cage is omitted in FIG. 2.

An assembly is provided by assembling the outer ring 1, the inner ring 2, the plurality of balls 3, and the cage (not shown).

The solid lubricating composition 9 in a non-solidified state (fluid state), which contains the ultraviolet beam curable resin material (containing the photopolymerization initiator) and at least one of the lubricants described above is placed in the non-sealed chamber defined by the inner peripheral surface of the outer ring 1 and the outer peripheral surface of the inner ring 2.

After that, as shown in FIG. 2, the solid lubricating composition 9 in the non-solidified state is irradiated with the ultraviolet beam by using an ultraviolet lamp 120 to solidify the solid lubricating composition 9. Specifically, while maintaining the ultraviolet beam lamp 120 in a state where the ultraviolet beam lamp 120 is opposite in the axial direction to an opening at one side in the axial direction between the outer ring 1 and the inner ring 2, the ultraviolet beam lamp 120 is moved on a circle for intensively solidifying a part of the solid lubricating composition 9 on one side of the ball 3 in the axial direction. After that, the ultraviolet beam lamp 120 is moved to a position opposite in the axial direction to an opening at the other side in the axial direction between the outer ring 1 and the inner ring 2 and moved on the circle while maintaining the ultraviolet beam lamp 120 in a state where the ultraviolet beam lamp 120 is opposite in the axial direction to the opening at the other side in the axial direction between the outer ring 1 and the inner ring 2 for intensively solidifying a part of the solid lubricating composition 9 on the other side of the ball 3 in the axial direction.

Lastly, two sealing members (not shown) are so disposed as to cover the openings on the both sides in the axial direction between the outer ring 1 and the inner ring 2. Thus, the ball bearing manufacture is completed.

According to the ball bearing of the above embodiment, since the solid lubricating composition 9 is disposed in the rolling element disposing chamber, it is possible to reliably lubricate the inner and outer rings 1 and 2 and the balls 3 under severe conditions of a high load, a high temperature, impact load, and the like.

Further, according to the ball bearing of the above embodiment, since the resin material contained in the solid lubricating composition 9 is the ultraviolet beam curable resin having the property of being solidified when the resin in the fluid state is irradiated with the ultraviolet beam, it is possible to solidify the solid lubricating composition 9 only by irradiating the solid lubricating composition in the non-solidified state with the ultraviolet beam for a several tens of seconds. Therefore, unlike the conventional example, it is unnecessary to cool the temperature of the rolling element disposing chamber after heating to the temperature of 150° C. or more for solidifying the solid lubricating composition 9. Therefore, it is possible to prevent a reduction in hardness of the outer ring 1 and the inner ring 2 that are the members forming the rolling element disposing chamber as well as to prevent the members from becoming fragile, thereby making it possible to maintain strength of the members (outer ring 1 and inner ring 2 in this embodiment) forming the rolling element disposing chamber to predetermined strength. Further, since it is possible to solidify the solid lubricating composition 9 in the short time, it is possible to lengthen duration of use (pot life). Further, since the ultraviolet beam curable resin does not contain any solvent, no environmentally adverse influence is caused. Further, since the interior of the ball bearing is kept under a light-shielded state, long storage life is ensured.

Further, according to the ball bearing of the above embodiment, it is unnecessary to cool the temperature of the rolling element disposing chamber after heating to the temperature of 150° C. or more for solidifying the solid lubricating composition 9, which is different from the conventional example. Therefore, it is possible to reduce the time required for heating the temperature of the rolling element disposing chamber to the temperature of 150° C. or more, thereby remarkably reducing a cycle time in manufacture of the ball bearing.

According to the ball bearing manufacturing method of the above embodiment, it is unnecessary to raise the temperature of the non-sealed chamber to the temperature of 150° C. or more for solidifying the solid lubricating composition 9. Therefore, it is possible to prevent a reduction in hardness of the outer ring 1 and the inner ring 2 that are the members forming the non-sealed chamber as well as to prevent the members from becoming fragile, thereby making it possible to maintain strength of the members (outer ring 1 and inner ring 2 in this embodiment) forming the non-sealed chamber to predetermined strength.

Further, according to the ball bearing manufacturing method of the above embodiment, it is unnecessary to cool the temperature of the rolling element disposing chamber after heating to the temperature of 150° C. or more for solidifying the solid lubricating composition 9, which is different from the conventional example. Therefore, it is possible to reduce the time required for heating the temperature of the rolling element disposing chamber to the temperature of 150° C. or more, thereby remarkably reducing a cycle time in manufacture of the ball bearing.

According to the ball bearing manufacturing method of the above embodiment, since the resin material contains the photopolymerization initiator, it is possible to solidify the solid lubricating composition 9 only by irradiating the solid lubricating composition 9 in the non-solidified state with the ultraviolet beam, thereby making it possible to solidify the solid lubricating composition 9 simply, at a low cost, and rapidly.

Although the solid lubricating composition 9 is disposed between the outer ring 1 and the inner ring 2 of the rolling bearing wherein the rolling element is the balls 3, the solid lubricating composition may be disposed between an outer ring and an inner ring of a rolling bearing in which the rolling element is a member other than the balls, such as a cylindrical roller, a tapered roller, and a convex roller, in the present invention. Further, although the solid lubricating composition 9 is disposed between the outer ring 1 and the inner ring 2 of the ball bearing having the cage, the solid lubricating composition may be disposed between an outer ring and an inner ring of a full complement ball bearing that does not have any cage in the present invention.

Although the rolling device is the ball bearing, and the solid lubricating composition 9 is disposed between the outer ring 1 and the inner ring 2 in the above-described embodiment, the rolling element may be a linear system, and a solid lubricating composition containing resin material that is solidified by irradiation with an ultraviolet beam may be disposed in a rolling element disposing chamber of the linear system. Further, the rolling device may be a ball screw, and the solid lubricating composition containing the resin material that is solidified by irradiation with the ultraviolet beam may be disposed in a ball disposing chamber of the ball screw.

In the above-described embodiment, the first sealing member 7 contacts the inner ring 2, the second sealing member 8 contacts the inner ring 2, and the rolling element disposing chamber is in the sealed state as shown in FIG. 1. However, in the present invention, the sealing member may not contact the inner ring, and the sealing member may be used for labyrinth sealing. Further, the sealing member may be omitted. As described above, the rolling element disposing chamber may be in a state of being not perfectly sealed, and the rolling element disposing chamber may be in the sealed state or a non-sealed state.

Further, in the ball bearing manufacturing method of the above-described embodiment, the ultraviolet beam lamp 120 is moved from the position opposite to the one opening to the position opposite to the other opening for solidifying the parts of the solid lubricating-composition 9 positioned on both sides of the ball 3. However, in the present invention, a mirror may be disposed in such a fashion that a mirror surface faces to the ball and the mirror covers the opening at one side in the axial direction between the outer ring and the inner ring, and the solid lubricating composition may be solidified by moving the ultraviolet beam lamp on the circle while maintaining the state of being opposite to the opening on the other side in the axial direction between the outer ring and the inner ring and not moving the ultraviolet beam lamp from the position opposed to the one opening to the position opposed to the other opening.

Further, in the ball bearing manufacturing method of the invention, the ultraviolet beam lamp 120 is moved on the circle while maintaining the state that the lamp is opposed to the opening at the one side in the axial direction between the outer ring and the inner ring, thereby solidifying the solid lubricating composition 9. However, in the present invention, the ultraviolet beam lamp may be disposed on the center axis (axis corresponding to "p" in FIG. 2) of the inner ring without moving the ultraviolet beam lamp on the circle, thereby solidifying the solid lubricating composition.

In this method, the solid lubricating composition may be solidified by moving the ultraviolet beam lamp from the position on one side in the axial direction of the inner ring on a central axis of the inner ring to the position on the other side in the axial direction of the inner ring on the central axis of the inner ring, or the solid lubricating composition may be solidified by disposing the ultraviolet beam lamp on the position on the other side in the axial direction of the inner ring on the central axis of the inner ring in a state where a mirror covers the opening on one side in the axial direction between the outer ring and the inner ring while a mirror surface faces to the ball.

Further, the solid lubricating composition may be solidified by placing a plurality of ultraviolet beam lamps in a normal line direction of an end surface in an axial direction of the bearing ring of the rolling bearing and at a position remote from the rolling bearing and simultaneously irradiating a whole part of the end surface in the axial direction of the rolling bearing with ultraviolet beams that are parallel in the normal line direction.

Although the solid lubricating composition 9 contains the resin material that is solidified by the ultraviolet beam irradiation and is solidified by irradiating the solid lubricating composition 9 in the fluid state with the ultraviolet beam in the above-described ball bearing manufacturing method, the solid lubricating composition may contain a resin that is solidified by electron beam irradiation and may be solidified by irradiating the solid lubricating composition in the fluid state with the electron beam. Examples of the resin material solidified by the electron beam irradiation include the resin materials solidified by the ultraviolet beam irradiation and resin materials that do not contain any photopolymerization initiator or photopolymerization accelerator among the above-described materials.

In the solid lubricating composition which contains the resin curable by the ultraviolet beam irradiation, only the part irradiated with the ultraviolet beam is solidified. Therefore, by changing a timing for the ultraviolet beam irradiation depending on a position of the solid lubricating composition in a radial direction of the outer ring, it is possible to control the order of parts of the solid lubricating composition to be solidified as well as to control a direction of shrinkage of the solid lubricating composition, thereby approximating the actual location of the solid lubricating composition to a desired location of the solid lubricating composition.

Figure 3:
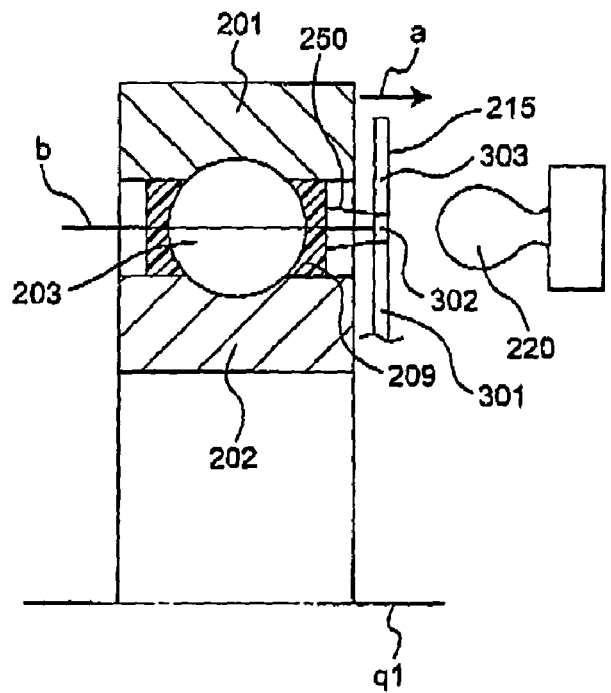
FIG. 3 is a schematic diagram illustrating a ball bearing manufacturing method according to another embodiment of the rolling device manufacturing method of the present invention.

FIG. 3 is a schematic diagram illustrating a ball bearing manufacturing method that is another embodiment of the rolling device manufacturing method of the present invention. Since FIG. 3 is a schematic diagram, the shape of the ball bearing is not precisely accurate, and a cage is omitted in FIG. 3.

Further, in the ball bearing manufacturing method illustrated in FIG. 3, descriptions of effects that are in common with the ball bearing manufacturing method of the embodiment described by using FIG. 2 and modification examples are omitted, and only structures, effects, and modification examples that are different from the ball bearing manufacturing method of the embodiment described by using FIG. 2 will be described.

In this embodiment, a ball bearing will be manufactured as described below.

Firstly, an outer ring 201, an inner ring 202, a plurality of balls 203, and a cage (not shown) are assembled to form an assembly.

A solid lubricating composition 209 in a non-solidified state (fluid state) and containing the ultraviolet beam resin material described in the foregoing and at least one of the lubricants described in the foregoing is placed in a non-sealed chamber formed of an inner peripheral surface of the outer ring 201 and an outer peripheral surface of the inner ring 202.

Figure 4:
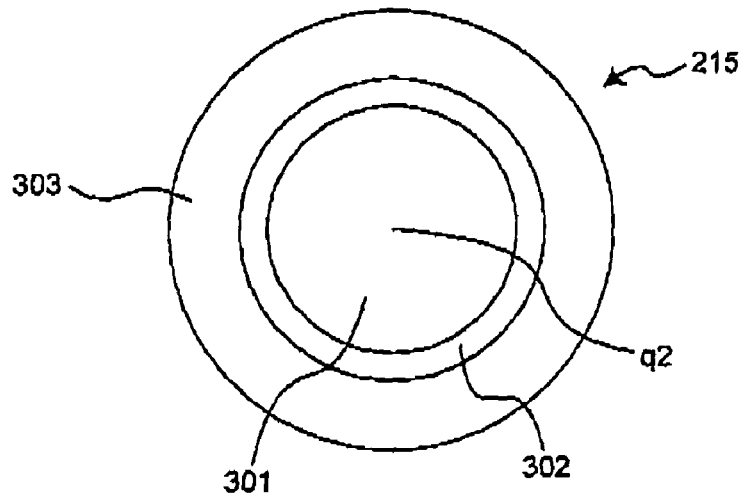
FIG. 4 is a plan view showing one end surface of a circular plate member.

After that, a circular plate member 215 is so disposed as to cover an end surface in an axial direction of the ball bearing. FIG. 4 is a plan view showing one end surface of the circular plate member 215. The circular plate member 215 is formed of a first ultraviolet beam shielding part 301 in the form of a circular plate and made from a material capable of shielding an ultraviolet beam, a ring-like ultraviolet beam transmitting part 302 made from a material capable of transmitting the ultraviolet beam, and a ring-like second ultraviolet beam shielding part 303 made from a material capable of shielding the ultraviolet beam. As shown in FIG. 4, an outer peripheral surface of the first ultraviolet beam shielding part 301 contacts an inner peripheral surface of the ultraviolet beam transmitting part 302, and an outer peripheral surface of the ultraviolet beam transmitting part 302 contacts an inner peripheral surface of the second ultraviolet beam shielding part 303. A diameter of a circle formed by a position at the center in a radial direction of the ultraviolet beam transmitting part 302 is the same as a pitch circle diameter (PCD) of the ball bearing of FIG. 3. The circular plate member 215 is disposed in such a fashion that one end surface of the circular plate member 215 contacts an end surface in the axial direction of the ball bearing, and that a central axis q2 (see FIG. 4) of the circular plate 215 overlaps with a central axis q1 of the inner ring 2.

While moving an ultraviolet beam lamp 220 on the circle in a state of being opposite in the axial direction to the center in a radial direction of the ultraviolet beam transmitting part 302, the circular plate member 215 is moved very slowly in a normal line direction of the end surface in the axial direction of the ball bearing toward a direction indicted by an arrow a in FIG. 3 that is a direction departing from the ball bearing. Thus, a region to be irradiated with the ultraviolet beam is gradually expanded from a position on a cylindrical surface b including a pitch circle of the ball bearing and extending in the normal line direction to inside and outside of the position in the radial direction, so that the solid lubricating composition 209 is gradually solidified inward and outward in the radial direction from the position on the cylindrical surface b.

After one side of the solid lubricating composition 209 in the axial direction of the ball 203 is solidified, the circular plate member 215 and the ultraviolet beam lamp 220 are moved to the other side of the solid lubricating composition 209 in the axial direction of the ball 203 to solidify the other side in the radial direction of the ball 203 in the same manner as in the one side of the solid lubricating composition 209 in the axial direction of the ball 203.

Lastly, two sealing members (not shown) are so disposed as to cover openings on the both sides in the axial direction between the outer ring 201 and the inner ring 202 to complete the ball bearing manufacture.

According to the ball bearing manufacturing method in the above-described embodiment, the solid lubricating composition 209 is shrunk from the outside in the radial direction to the center in the radial direction as well as from the inside in the radial direction to the center in the radial direction. Therefore, the solid lubricating composition 209 is suppressed from contacting the outer ring 201 and the inner ring 202.

According to the ball bearing manufacturing method in the above-described embodiment, the solid lubricating composition 209 is gradually solidified from the position on the solid lubricating composition 209 including the pitch circle of the ball bearing and located on the cylindrical surface b extending in the normal line direction to the inside and outside in the radial direction. However, in the present invention, the solid lubricating composition may be gradually solidified from the outside in the radial direction to the inside in the radial direction, so that an inner peripheral surface of the solid lubricating composition is solidified lastly.

It is needless to say that it is possible to change the order of parts to be irradiated with the ultraviolet beam as required depending on the type, performance, and the like of the bearing.

What is claimed is:

1. A method of manufacturing a rolling device comprising:
placing a solid lubricating composition inside a non-sealed chamber in a state where rolling elements are placed therein and the non-sealed chamber is not sealed and in a state that the solid lubricating composition is not solidified, in which the solid lubricating composition includes lubricant and resin material which has a property in which the resin material is solidified when the resin material, in a non-solidified state, is irradiated with at least one of an electron beam or an ultraviolet beam; and solidifying the solid lubricating composition by irradiating the solid lubricating composition in the non-solidified state with at least one of the electron beam and the ultraviolet beam,
wherein the rolling element is disposed between a raceway surface of an outer ring and a raceway surface of an inner ring,
wherein the non-sealed chamber is defined by an inner periphery of the outer ring and an outer periphery of the inner ring,
wherein the ultraviolet beam is irradiated from outside in an axial direction of the outer ring,
wherein a timing for irradiating the ultraviolet beam is varied depending on a position of the solid lubricating composition in a radial direction of the outer ring, and
wherein a region to be irradiated with the ultraviolet beam is gradually expanded from a position including a pitch circle of a ball bearing to inside and outside of the position in the radial direction, so that the solid lubricating composition is gradually solidified inward and outward in the radial direction from the position including the pitch circle of the ball bearing.

2. The method according to claim 1, wherein the resin material includes a photopolymerization initiator, and
wherein the solid lubricating composition in the non-solidified state is irradiated with the ultraviolet beam to be solidified.

3. The method according to claim 1, further comprising:
disposing a circular plate member between a source of the at least one of the electron beam and the ultraviolet beam and the solid lubricating composition, the circular plate member comprising:
a first shielding part comprising a circular plate;
a ring-like transmitting part comprising a material capable of transmitting the at least one of the electron beam and the ultraviolet beam disposed radially outward from the first shielding part; and
a ring-like second ultraviolet beam shielding part comprising a material capable of shielding the at least one of the electron beam and the ultraviolet beam disposed radially outward from the ring-like transmitting part.

4. The method according to claim 3, wherein a diameter of a center of the ring-like transmitting part is equal to a pitch circle diameter of the rolling device.

5. The method according to claim 3, wherein the circular plate member is moved away from the rolling device and closer to the source of the at least one of the electron beam and the ultraviolet beam during the solidifying of the solid lubricating composition.

6. The method according to claim 1, wherein the non-sealed chamber comprises a temperature of less than 150° C. during the placing of the solid lubricating composition and the solidifying the solid lubricating composition.

7. The method according to claim 1, wherein a ratio of the lubricant in a total amount of the solid lubricating composition is in a range of 20 wt. % to 90 wt. %.

8. The method according to claim 1, wherein a ratio of the resin in a total amount of the solid lubricating composition is in a range of 10 wt. % to 80 wt. %.

9. The method according to claim 1, wherein sealing members are disposed so as to cover openings on both sides, in the axial direction, between the outer ring and the inner ring.

10. A method of manufacturing a rolling device comprising:
placing a solid lubricating composition inside a non-sealed chamber in a state where rolling elements are placed therein and the non-sealed chamber is not sealed and in a state that the solid lubricating composition is not solidified, in which the solid lubricating composition includes lubricant and resin material which has a property in which the resin material is solidified when the resin material, in a non-solidified state, is irradiated with at least one of an electron beam or an ultraviolet beam; and solidifying the solid lubricating composition by irradiating the solid lubricating composition in the non-solidified state with at least one of the electron beam and the ultraviolet beam, wherein the rolling element is disposed between a raceway surface of an outer ring and a raceway surface of an inner ring, wherein the non-sealed chamber is defined by an inner periphery of the outer ring and an outer periphery of the inner ring, wherein the ultraviolet beam is irradiated from outside in an axial direction of the outer ring, wherein a timing for irradiating the ultraviolet beam is varied depending on a position of the solid lubricating composition in a radial direction of the outer ring, and wherein a region to be irradiated with the ultraviolet beam is gradually expanded from outside of the position in the radial direction to inside of the position in the radial direction, so that the solid lubricating composition is gradually solidified from the outside in the radial direction to the inside in the radial direction, so that an inner peripheral surface of the solid lubricating composition is solidified lastly.

11. The method according to claim 10, wherein the resin material includes a photopolymerization initiator, and wherein the solid lubricating composition in the non-solidified state is irradiated with the ultraviolet beam to be solidified.

12. The method according to claim 10, further comprising:
disposing a circular plate member between a source of the at least one of the electron beam and the ultraviolet beam and the solid lubricating composition, the circular plate member comprising:
  a first shielding part comprising a circular plate;
  a ring-like transmitting part comprising a material capable of transmitting the at least one of the electron beam and the ultraviolet beam disposed radially outward from the first shielding part; and
  a ring-like second ultraviolet beam shielding part comprising a material capable of shielding the at least one of the electron beam and the ultraviolet beam disposed radially outward from the ring-like transmitting part.

13. The method according to claim 12, wherein a diameter of a center of the ring-like transmitting part is equal to a pitch circle diameter of the rolling device.

14. The method according to claim 12, wherein the circular plate member is moved away from the rolling device and closer to the source of the at least one of the electron beam and the ultraviolet beam during the solidifying of the solid lubricating composition.

15. The method according to claim 10, wherein the non-sealed chamber comprises a temperature of less than 150° C. during the placing of the solid lubricating composition and the solidifying the solid lubricating composition.

16. The method according to claim 10, wherein a ratio of the lubricant in a total amount of the solid lubricating composition is in a range of 20 wt. % to 90 wt. %.

17. The method according to claim 10, wherein a ratio of the resin in a total amount of the solid lubricating composition is in a range of 10 wt. % to 80 wt. %.

18. The method according to claim 10, wherein sealing members are disposed so as to cover openings on both sides, in the axial direction, between the outer ring and the inner ring.

* * * * *